(12) United States Patent
Delaplace et al.

(10) Patent No.: US 7,366,592 B2
(45) Date of Patent: Apr. 29, 2008

(54) SYSTEM FOR AUTOMATICALLY CONTROLLING LIFT-ENHANCING DEVICES OF AN AIRCRAFT, IN PARTICULAR WING LEADING EDGE SLATS

(75) Inventors: Franck Delaplace, Toulouse (FR); Dominique Buisson, Toulouse (FR)

(73) Assignee: Airbus France, Toulouse (FR)

( * ) Notice: Subject to any disclaimer, the term of this patent is extended or adjusted under 35 U.S.C. 154(b) by 726 days.

(21) Appl. No.: 10/890,182

(22) Filed: Jul. 14, 2004

(65) Prior Publication Data

US 2007/0185628 A1 Aug. 9, 2007

(30) Foreign Application Priority Data

Jul. 15, 2003 (FR) .................................. 03 08603

(51) Int. Cl.
*B64C 1/00* (2006.01)
(52) U.S. Cl. .................... 701/4; 701/3; 701/15; 701/16; 244/75.1
(58) Field of Classification Search .................... 701/3, 701/4, 13–16; 244/17.21, 17.23, 17.25, 17.27, 244/75.1
See application file for complete search history.

(56) References Cited

U.S. PATENT DOCUMENTS 4,017,045 A 4/1977 Kirchhein
4,042,197 A 8/1977 Boyle et al.
4,591,113 A 5/1986 Mabey
5,921,506 A * 7/1999 Appa .......................... 244/219
6,824,109 B2 * 11/2004 Garver ........................ 244/206
2002/0047072 A1 * 4/2002 Garver ........................ 244/206
2002/0099479 A1 7/2002 Chatrenet et al.

FOREIGN PATENT DOCUMENTS

FR 2425380 12/1979
FR 2817535 6/2002

* cited by examiner

*Primary Examiner*—Gertrude A. Jeanglaude
(74) *Attorney, Agent, or Firm*—Dickinson Wright, PLLC

(57) ABSTRACT

A control system for an aircraft includes an actuation section that moves lift-enhancing devices as a function of received control orders, a control member operable by a pilot of the aircraft, and a control unit that includes a control section that produces control orders, as a function of actuation of the control member, so as to control the actuation section to bring the lift-enhancing devices into a predetermined position. The control unit further includes a device that produces automatically auxiliary control orders which are transmitted to the actuation section to automatically retract the lift-enhancing devices when the aircraft is in a first flight condition and another device that automatically disables control orders produced by the control section following actuation of the control member to deploy the lift-enhancing devices when the aircraft is in a second flight condition.

13 Claims, 5 Drawing Sheets

SYSTEM FOR AUTOMATICALLY CONTROLLING LIFT-ENHANCING DEVICES OF AN AIRCRAFT, IN PARTICULAR WING LEADING EDGE SLATS

FIELD OF THE INVENTION

The present invention relates to a system for automatically controlling lift-enhancing devices of an aircraft, in particular wing leading edge slats.

Although not exclusively, the present invention applies more particularly to an airplane, in particular a wide-bodied transport plane.

BACKGROUND OF THE RELATED ART

It is known, with the aim of modifying the lift of the flying surface of an airplane or of modifying its margin vis-à-vis aerodynamic stalling, to equip said flying surface with standard lift-enhancing devices (leading edge slats and/or trailing edge flaps) which are deployable and retractable. These lift-enhancing devices make it possible to substantially increase the lift of the airplane, when they are deployed, and thus to decrease its approach speed.

The pilot of an airplane configures, with the aid of a standard control member, the so-called slats/flaps lever, said lift-enhancing devices into the position of his choice, as a function of the conditions (speed, altitude, etc.) and of the phases of flight (rolling, takeoff, climb, cruising, descent, standby, approach, landing). The positions of the lift-enhancing devices vary progressively between a first position corresponding to complete retraction of said slats and flaps ("cruising" position) and a second position corresponding to complete deployment of said slats and flaps ("landing" position) so as to be able to define several known configurations of the airplane. A given configuration of the airplane therefore corresponds to a particular position of said slats and of said flaps.

These lift-enhancing devices are structurally dimensioned in a known manner, on the basis of the following characteristics:

determination of the minimum flight domain required;
consideration of regulatory wind gusts so as to deduce therefrom the corresponding maximum aerodynamic loads;
application of the other possible loads encountered by the lift-enhancing devices (loads on the ground for example) so as to deduce therefrom the limit loads; and
determination of the associated extreme loads by application of a safety coefficient on the basis of said limit loads.

Nevertheless, it may happen, in the course of a flight, that the aerodynamic loads applied to these lift-enhancing devices overshoot the limit loads which were used to dimension them, in such a way as to cause significant and irreversible damage (in the form of plastic deformation) to said lift-enhancing devices.

Such situations may be encountered during strong atmospheric disturbances (significant gusts of wind), during unconventional piloting maneuvers (airplane recovery dive) or during erroneous actions on the part of the navigating crew on the member (or lever) for controlling the slats and/or flaps [for example, during the cruising or descent phase, the pilot may move said member for controlling the slats and flaps in error, when he wanted to activate that for the air brakes, the two members being close together]. In this latter situation, a consequence of the pilot's erroneous action would be to produce a considerable nose-up moment on the airplane, difficult for the pilot to counter.

Systems are known which automatically position or move aerodynamic control surfaces of aircraft, such as lift-enhancing devices. By way of illustration, it will be noted that:

document FR-2 425 380 describes a control system which, when an engine of the airplane develops a fault, acts automatically on the control surfaces so as to aerodynamically reconfigure the airplane, in such a way as to compensate for the effect of the loss of thrust on the aerodynamic characteristics of the wing;

document U.S. Pat. No. 4,042,197 describes a device whose aim is to optimize, in the takeoff and approach phase of an airplane, the position of the flaps, as well as the thrust in such a way as to substantially reduce the noise produced by these items of equipment; and the document FR-2 817 535 discloses a system making it possible to automatically optimize the position of lift-enhancing devices during the takeoff phase of an aircraft so as to reduce the length of runway necessary for takeoff and to reduce the drag, thereby making it possible to obtain a minimum climb slope (with a faulty engine) allowing completely safe takeoff.

It will be noted moreover that these control systems apply in essence either to the control surfaces or to the trailing edge flaps, and not to the leading edge slats of the airplane. The main reason is that the lift of an airplane is limited by a stalling phenomenon which appears when the angle of incidence of the airplane overshoots a certain angle of incidence value called the "stalling angle of incidence". Specifically, at high angles of incidence, the flow becomes unstable on the suction face of the flying surface, the air streams detach, resulting in a loss of lift. It is known that the value of this stalling angle of incidence decreases slightly as the trailing edge flaps are deflected. It is for this reason that the leading edge slats are deployed as and when the trailing edge flaps are deployed. However, a system which retracts or deploys said flaps automatically is relatively neutral in terms of margin with respect to stalling and may therefore be regarded as relatively safe vis-à-vis this aerodynamic phenomenon.

On the other hand, the deflection of the leading edge slats is a parameter which strongly influences the value of the stalling angle of incidence. Consequently, going from a deflection Ab to a deflection Cb, with Cb less than Ab, may turn out to be dangerous. Specifically, whereas under the conditions of deflection Ab, the stalling angle of incidence remains far from the flight point, under the conditions of deflection Cb, the airplane may find itself beyond the stalling angle of incidence.

Consequently, since the risk of finding itself in a weak margin situation (or even negative) with respect to the phenomenon of stall is not zero, the position of the leading edge slats is controlled exclusively by manual action of the pilot, via the slats/flaps lever.

SUMMARY OF THE INVENTION

An object of the present invention is to remedy these drawbacks. It relates to a system for controlling lift-enhancing devices of an aircraft, and more specifically the wing leading edge slats of an airplane, making it possible to automatically optimize their position vis-à-vis flight conditions that are unfavorable in terms of aerodynamic loads.

To this end, according to the invention, said system of the type comprising:

actuation means, for moving said lift-enhancing devices, as a function of control orders received;

at least one control member able to be actuated by a pilot of the aircraft; and a control unit which comprises a control means which is able to produce control orders, as a function of the actuation of said control member, so as to control said means of actuation so that the latter bring said lift-enhancing devices into a determined position, is noteworthy in that said control unit furthermore comprises:

a first device able to produce, automatically, auxiliary control orders which are transmitted to said actuation means so as to automatically retract said lift-enhancing devices, when the aircraft is in a first flight condition; and a second device for automatically disabling control orders produced by said control means following actuation of said control member so as to deploy said lift-enhancing devices, when the aircraft is in a second flight condition.

Thus, by virtue of the invention, when the aircraft is in said first flight condition, that is to say, as will be seen hereinbelow, in a flight condition that may give rise to structural damage at the level of the lift-enhancing devices, said lift-enhancing devices (in particular leading edge slats) are automatically retracted, and hence protected, while guaranteeing the safety of the aircraft by virtue of protection vis-à-vis the stalling angle of incidence, as specified hereinafter. The present invention is particularly well (although not exclusively) suited to the control of aircraft flying surface leading edge slats, as lift-enhancing devices.

Moreover, when the lift-enhancing devices are instructed to deploy, but the flight situations are not favorable or dangerous (second aforesaid flight condition), the system in accordance with the invention disables their deployment and therefore protects the aircraft vis-à-vis unfavorable situations such as these, specified hereinafter.

Furthermore, the control of the lift-enhancing devices is carried out automatically, without any intervention from the pilot of the aircraft, thereby allowing said pilot to concentrate exclusively on piloting.

According to the invention, said first device continuously and automatically verifies whether the aircraft is in said first flight condition, by taking account of the speed and of the angle of incidence of the aircraft.

In a preferred embodiment, said first device comprises:

a first means for monitoring the speed of the aircraft and for emitting as appropriate a first signal indicating an overshoot of a permitted limit speed;

a second means for monitoring the angle of incidence of the aircraft and for emitting as appropriate a second signal indicating an overshoot of a permitted limit angle of incidence; and a third means for producing said auxiliary control orders, when at least said first and second means emit said first and second signals at the same time.

In this case, advantageously:

said first means compares the actual speed of the aircraft with said permitted limit speed corresponding to a permitted maximum speed, which depends on the current configuration and on the weight of the aircraft; and/or said second means compares the actual angle of incidence of the aircraft with said permitted limit angle of incidence corresponding to a stalling angle of incidence which depends on a configuration of the aircraft that one seeks to obtain and on the Mach number of the aircraft.

Furthermore, in a particular embodiment, said first device furthermore comprises a fourth means for monitoring the derivative of the angle of incidence of the aircraft and for emitting as appropriate a fourth signal, and wherein said third means produces said auxiliary control orders, only when said fourth signal is emitted at the same time as said first and second signals mentioned above. This makes it possible to increase safety still further.

Moreover, advantageously, said fourth means comprises:

a first element for comparing the derivative of the angle of incidence of the aircraft with a predetermined threshold value and for emitting as appropriate a signal indicating an overshoot of this threshold value;

a second element for comparing the actual angle of incidence of the aircraft with an angle of incidence value dependent on the stalling angle of incidence and for emitting as appropriate a signal indicating an overshoot of this angle of incidence value; and a third element for producing said fourth signal, when said first and second elements emit overshoot signals at the same time.

Additionally, according to the invention, said second device verifies, automatically, whether the aircraft is in said second flight condition, by taking account of the speed and of the altitude of the aircraft.

In a preferred embodiment, said second device comprises:

a fifth means for monitoring the speed of the aircraft and for emitting as appropriate a fifth signal indicating an overshoot of a permitted limit speed;

a sixth means for monitoring the altitude of the aircraft and for emitting as appropriate a sixth signal indicating an overshoot of a permitted limit altitude; and a seventh means for producing disabling orders, when at least one of said fifth and sixth means emits one of said fifth and sixth signals.

In this case, advantageously:

said fifth means compares the actual speed of the aircraft with said permitted limit speed corresponding to a permitted maximum speed, which depends on the current configuration and on the weight of the aircraft. Preferably, said fifth means furthermore comprises a hysteresis loop, so as to avoid too many movements of the lift-enhancing devices, in the case where the actual speed of the aircraft oscillates around said permitted maximum speed; and/or said sixth means compares the actual altitude of the aircraft with said permitted limit altitude corresponding to a possible maximum altitude for a configuration of the aircraft that one seeks to obtain.

Furthermore, in a particular embodiment, said second device furthermore comprises:

an eighth means able to detect any actuation of the control member to deploy said lift-enhancing devices; and a ninth means which disables the control orders corresponding to such an actuation to deploy said lift-enhancing devices, when, at one and the same time, said eighth means detects such an actuation and said seventh means produces disabling orders.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
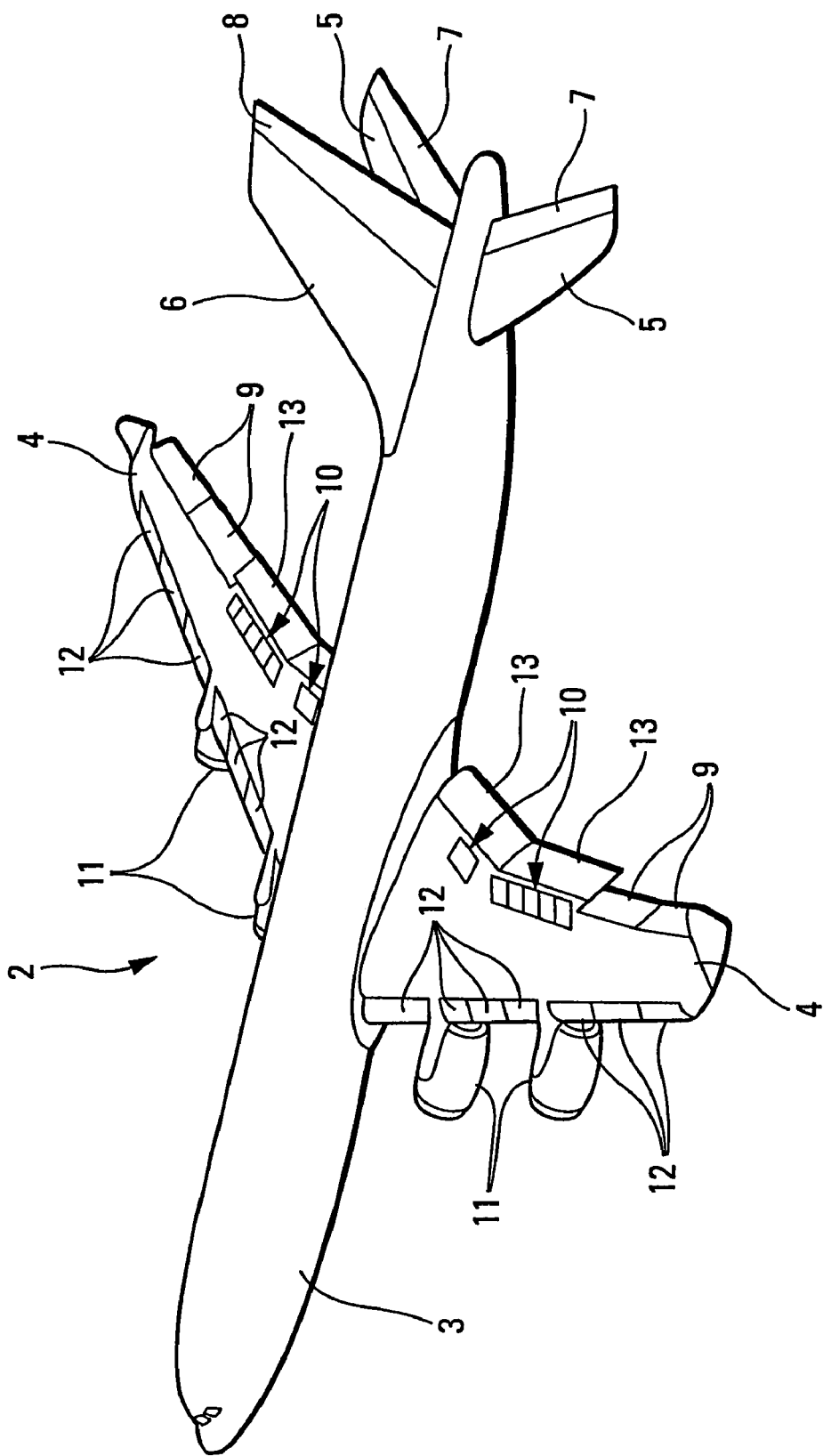
FIG. 1 shows a civil transport airplane to which a control system in accordance with the invention is applied.
Figure 2:
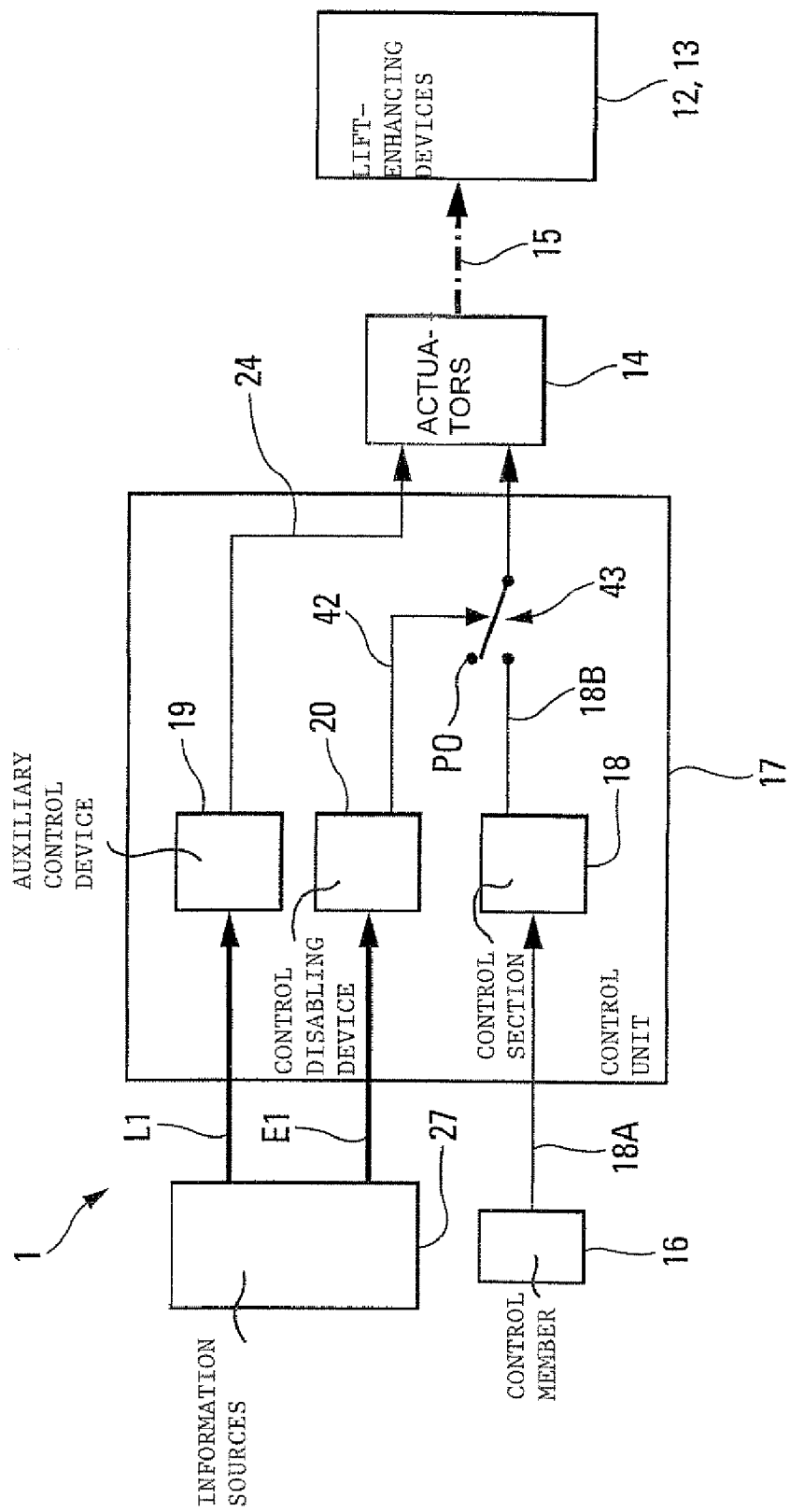
FIG. 2 is the schematic diagram of a control system in accordance with the invention.

The control system 1 in accordance with the invention and represented diagrammatically in FIG. 2 is applied to an aircraft 2, in particular a civil transport airplane, such as represented in FIG. 1 and considered in the following description by way of example.

This transport airplane 2 comprises a fuselage 3, to which are connected, among other things, two wings 4 forming the main flying surface, a horizontal rear empennage formed of two tailplanes 5 and a fin 6. Each of said tailplanes 5 is provided with an elevator 7, and the fin 6 is provided with rudder 8. Moreover, each of the wings 4 bears in particular, in a standard manner, ailerons 9, air brakes 10 and several propulsion engines 11.

To improve the performance of the airplane 2, each of said wings 4 is, moreover, provided with standard lift-enhancing devices, namely slats 12 at the leading edge of the wing 4 and flaps 13 at its trailing edge, which are able to be brought into various positions. These lift-enhancing devices 12, 13 make it possible to increase the lift of said airplane 2.

By way of example, each wing of an airplane of the "Airbus A340" type is equipped with seven slats 12 and two flaps 13.

The positions of the lift-enhancing devices 12, 13 vary progressively between a first position corresponding to complete retraction of said slats and flaps ("cruising" position) and a second position corresponding to complete deployment of said slats and flaps ("landing" position) in such a way as to be able to define several known configurations of the airplane 2, and termed "0", "1", "1+F", "2", "3" and "full" such that:

| Configuration of the airplane | Position of the slats 12 | Position of the flaps 13 |
| --- | --- | --- |
| "0": not lift-enhanced | 0 | 0 |
| "1": very weakly lift-enhanced | 20 | 0 |
| "1 + F": weakly lift-enhanced | 20 | 17 |
| "2": averagely lift-enhanced | 23 | 22 |
| "3": very lift-enhanced | 23 | 29 |
| "Full": completely lift-enhanced | 23 | 34 |

The system 1 which is carried on board the airplane 2 and which is intended to automatically control said lift-enhancing devices 12, 13 comprises, in a known manner, as represented in FIG. 2:
- a plurality of actuation means (grouped together under the single reference 14 in FIG. 2), so as to move said lift-enhancing devices 12, 13 (grouped together under a reference 12, 13 in FIG. 2), as a function of control orders received, as is illustrated by a chain dotted link 15;
- at least one control member 16, for example a slats/flaps lever, which is able to be actuated by a pilot of the airplane 2; and
- a control unit 17 which comprises a standard control means 18, which is able to produce control orders, as a function of the actuation of said control member 16, received by a link 18A, so as to control said actuation means 14 (link 18B) in such a way that the latter bring said lift-enhancing devices 12, 13 into a determined position.

The control system 1 in accordance with the invention is intended more particularly to automatically control said lift-enhancing devices so as to automatically optimize their position vis-à-vis flight conditions that are unfavorable in terms of aerodynamic loads. It is particularly well (although not exclusively) suited to the control of said leading edge slats 12, as lift-enhancing devices.

To do this, according to the invention, said control unit 17 furthermore comprises:
- a device 19 able to produce, automatically, auxiliary control orders which are transmitted to said actuation means 14 so as to automatically retract said slats 12 when the aircraft 2 is in a first flight condition specified hereinbelow; and
- a device 20 for automatically disabling control orders produced by said control means 18 following actuation of said control member 16 so as to deploy said slats 12 when the aircraft 2 is in a second flight condition specified hereinbelow.

Thus, by virtue of the invention, when the airplane 2 is in said first flight condition, that is to say, as will be seen hereinbelow, in a flight condition that may give rise to structural damage in particular at the level of the slats 12, said slats 12 are automatically retracted, and hence protected, while guaranteeing the safety of the airplane 2 by virtue of protection vis-à-vis the stalling angle of incidence, as specified hereinafter.

Moreover, when the slats 12 are instructed to deploy, but the flight situations are not favorable or dangerous (second aforesaid flight condition), the system 1 in accordance with the invention disables (by way of the device 20) their deployment and thus protects the airplane 2 vis-à-vis unfavorable situations such as these, specified hereinafter.

Furthermore, the control of the slats 12 is carried out automatically, without any intervention from the pilot of the airplane 2, thereby making it possible for said pilot to concentrate exclusively on the strict aspects of piloting.

According to the invention, said device 19 monitors the actual speed V of the airplane 2 so as to detect the presence of excessive aerodynamic loads, liable to damage said slats 12. This device 19 also monitors the actual angle of incidence α of said airplane 2, so as to ensure, in the case of a change of configuration of the slats 12, that said angle of incidence α is not too close to or even does not overshoot, the stalling angle of incidence of the new configuration (that one seeks to obtain).

To do this, in a preferred embodiment represented in FIG. 3, said device 19 comprises:
- a means 21 specified hereinbelow, for monitoring the speed V of the aircraft 2 and for emitting as appropriate a first signal indicating an overshoot of a permitted limit speed;
- a means 22 specified hereinbelow for monitoring the angle of incidence α of the aircraft 2 and for emitting as appropriate a second signal indicating an overshoot of a permitted limit angle of incidence; and
- a means 23, in this instance an AND logic gate, for producing said auxiliary control orders (intended for automatically retracting said slats 12) and for transmitting them to said actuation means 14 by way of a link 24, when at least said means 21, 22 emit said first and second signals at the same time (links 25 and 26).

Said device 19 is connected by a plurality of links l1 to l7 (grouped together under a single reference L1 in FIG. 2) to a set 27 of sources of information specified hereinbelow.

Said means 21 of the device 19 comprises a comparator 28 for comparing the actual speed V (received via the link l1) of the airplane 2 with said permitted limit speed corresponding to a permitted maximum speed, received from a table 29 via a link 30A.

This table 29 gives, as a function of the current configuration of the slats/flaps (link l2) and of the weight of the airplane 2 (link l3), said permitted maximum speed Vthres1 which represents the speed that the speed V of the airplane 2 must not overshoot so as not to damage the slats 12. Beyond this speed Vthres1, the slats 12 are retracted, so as to protect them against excessive aerodynamic loads.

Figure 4:
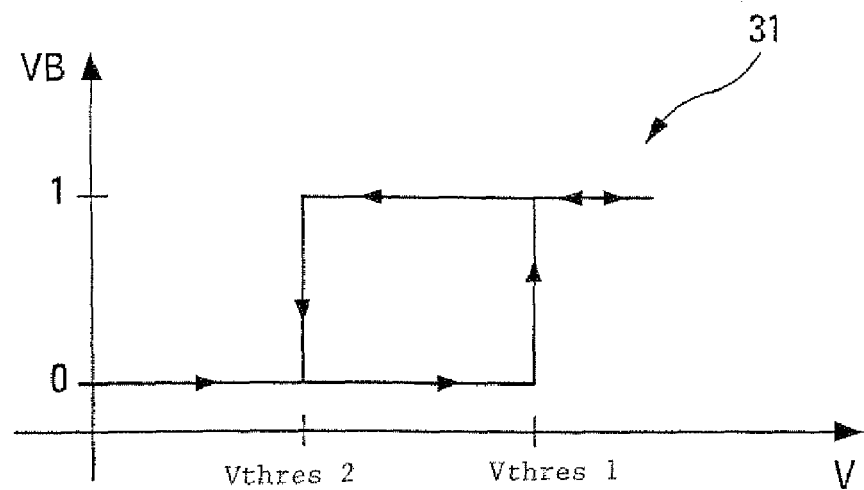
FIGS. 4 and 6 are charts making it possible to explain the operation of particular means of a control system in accordance with the invention.

Moreover, in order to avoid perpetual movement of said slats 12 in the case where the speed V of the airplane 2 oscillates around this speed Vthres1, a hysteresis element 31 (FIG. 4) is introduced into the comparator 28. Thus, as long as the speed of the airplane 2 has not dropped back below a speed Vthres2 (less than the speed Vthres1 and transmitted via a link 30B to the comparator 28), said comparator 28 sends the value "1" to the AND logic gate 23 as binary value VB, that is to say the slats 12 are then not permitted to be redeployed. They therefore remain retracted.

When the speed V of the airplane 2 becomes less than the speed Vthres2, the value "0" is transmitted, as binary value VB, to the AND logic gate 23.

The above condition is not sufficient to permit the retraction of the slats 12. Specifically, it is important to verify that the retraction of the slats 12 does not produce any excessive reduction in the margin vis-à-vis stalling, or even a drop in lift on account of an angle of incidence $\alpha$ of the airplane 2, greater than the stalling angle of incidence of the retracted configuration that one seeks to achieve (the angle of incidence $\alpha$ used, received via the link l4, may be smoothed by means of a filter 32 so as to circumvent any possible variations in measurement or effects of turbulence). This is the reason for the presence of the means 22 which compares the actual angle of incidence $\alpha$ of the airplane 2 with said permitted limit angle of incidence corresponding to a stalling angle of incidence.

This means 22 comprises a table 33 which calculates, as a function of the configuration that one seeks to obtain to protect the slats 12 (link l5) and as a function of the Mach number of the airplane 2 (link l6), the stalling angle of incidence $\alpha s$ of this configuration that one seeks to obtain. A means of calculation 34 then calculates the difference between this stalling angle of incidence $\alpha s$ and the actual angle of incidence $\alpha$, possibly smoothed, of the airplane 2. If the difference obtained is too small, this signifies that a retraction of the slats 12 would bring the airplane 2 into a condition close to that of stalling. It is therefore necessary for this difference to be greater than a threshold $\alpha thres1$ representing a sufficient safety margin for retracting the slats 12. A value of 5° for this threshold $\alpha thres1$ seems realistic. A comparator 35 carries out the corresponding comparison.

In a particular embodiment, making it possible to guarantee greater safety, the derivative of the angle of incidence $\alpha$ is moreover monitored, this making it possible to verify its direction of change. Specifically, the angle of incidence $\alpha$, following a strong vertical gust of wind for example, may vary greatly and in the short term exceed the stalling angle of incidence $\alpha s$.

To take this phenomenon into account, the device 19 can comprise a means 36 for monitoring the direction of variation of the angle of incidence $\alpha$. To do this, it is necessary for the derivative of the angle of incidence (received via the link l7) not to be too large (it must remain below a predetermined threshold $\alpha thres2$, this being verified by a comparator 37) and for the angle of incidence $\alpha$ not to be too close to the stalling angle of incidence $\alpha s$ (the difference received from the means 34 between these angles of incidence $\alpha s$ and $\alpha$ must be greater than a threshold $\alpha thres3$, this being verified by a comparator 38), so as to be certain that the variation in the angle of incidence will not make it reach or exceed the stalling angle of incidence $\alpha s$. By way of illustration, the following values may be proposed: $\alpha thres2$ may vary from 0.5°/s to 1°/s and $\alpha thres3$ may be equal to around 7°. At these two conditions only, the means 36 permits the retraction of the slats 12, by virtue of an AND logic gate 39 which is connected via a link 40 to the gate 23.

A means 22 and 36 may be mounted in one and the same single unit 41.

The aforesaid two (or three) states [relating to the speed (means 21) and to the angle of incidence (means 22) of the airplane 2, as well as possibly to the derivative of the angle of incidence (means 36)] must therefore both occur in order for the device 19 to be able to send the actuation means 14 the order for retraction of the slats 12, by way of the AND logic gate 23, via the link 24.

Additionally, the device 20 takes into account the altitude and speed conditions of the airplane 2, so as to prohibit the control means 18 from instructing deployment of the slats 12, when flight situations which may turn out to be damaging to said slats 12 or to the behavior of the airplane 2 (second aforesaid flight condition), are encountered. To this end, said device 20 can act (in a simplified manner) via a link 42 on a switching means 43 provided on the link 18B connecting the control means 18 to the actuation means 14 (FIG. 2).

Figure 5:
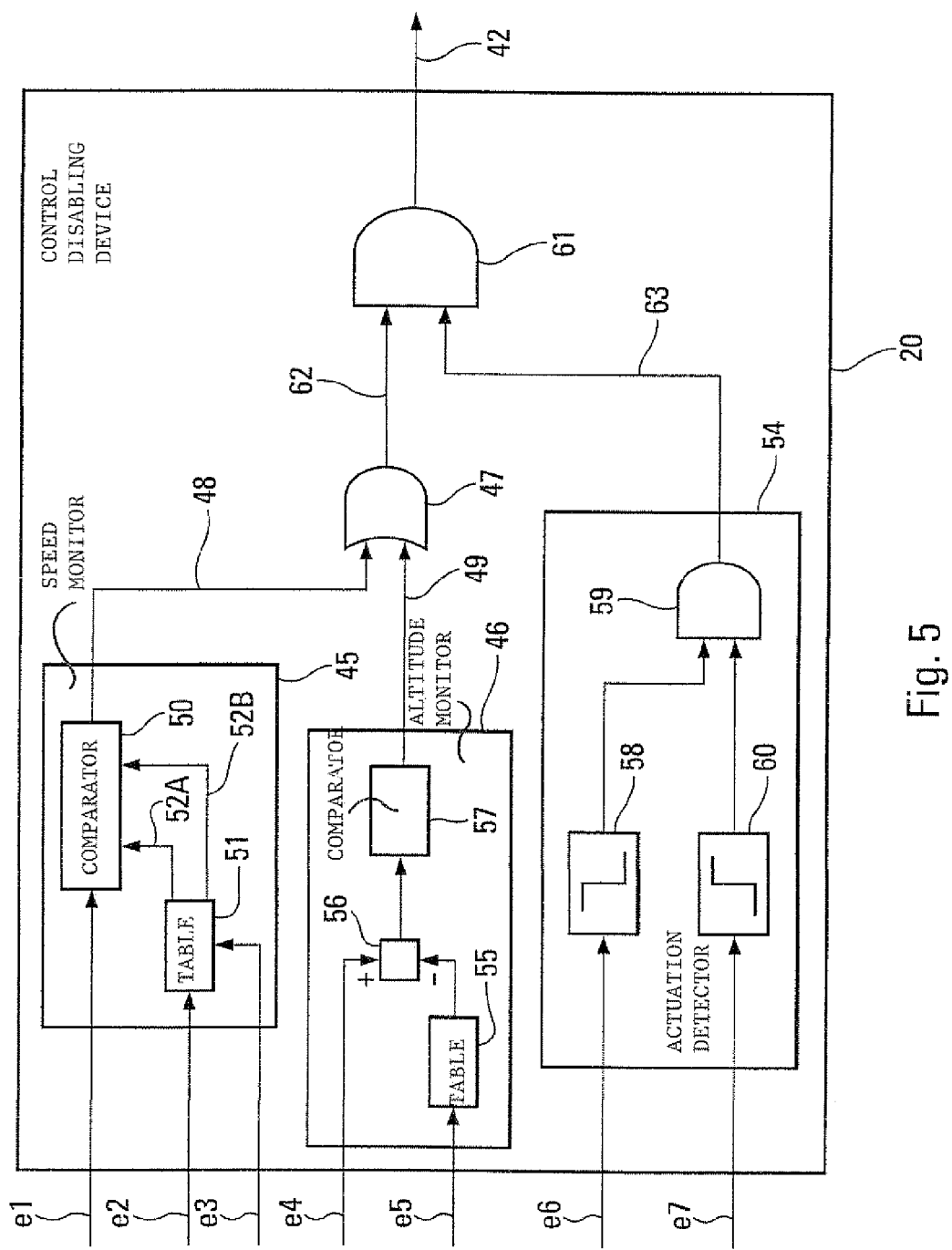

In a preferred embodiment represented in FIG. 5, said device 20 which verifies, automatically, whether the airplane 2 is in said second aforesaid flight condition, comprises:
  a means 45 for monitoring the speed of the aircraft 2 and for emitting as appropriate a first signal indicating an overshoot of a permitted limit speed;
  a means 46 for monitoring the altitude of the aircraft 2 and for emitting as appropriate a second signal indicating an overshoot of a permitted limit altitude; and
  a means 47, in this incidence an OR logic gate, for producing disabling orders, when at least one of said means 45 and 46 emits one of said first and second signals (via links 48 and 49).

The device 20 is connected, by a plurality of links e1 to e7 (grouped together under a single reference E1 in FIG. 2), to the set 27 of sources of information.

Said means 45 comprises a comparator 50 for comparing the actual speed V (received via the link e1) of the airplane 2 with said permitted limit speed corresponding to a permitted maximum speed received from a table 51 via a link 52A.

Figure 3:
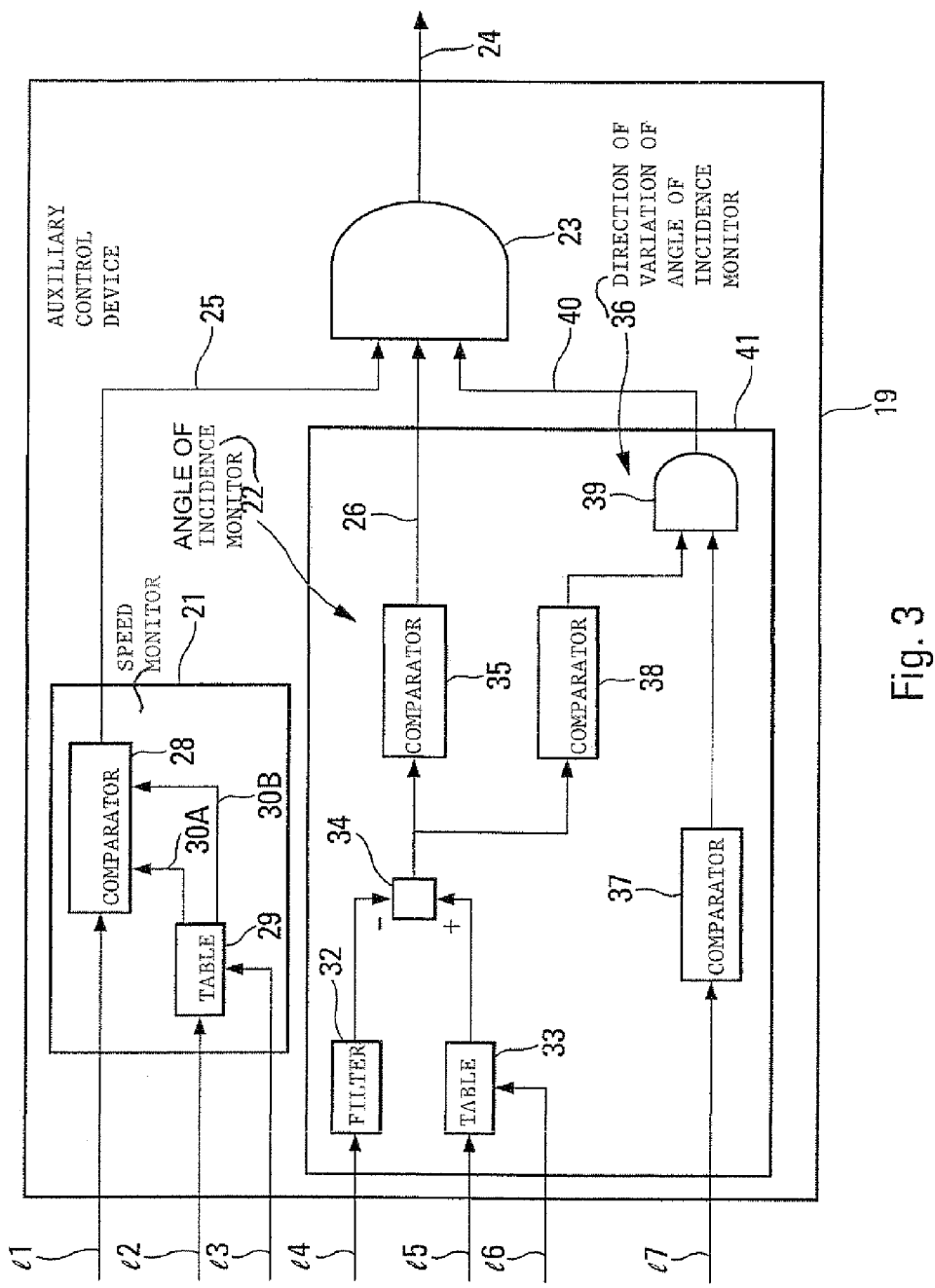
FIGS. 3 and 5 diagrammatically illustrate parts of a control system in accordance with the invention.

This table 51 which may be similar to the table 29 of FIG. 3, is also dependent on the weight of the airplane 2 (link e3) but, this time, dependent on the slats/flaps configuration that one seeks to achieve (link e2). This table 51 gives the maximum speed Vthres3 that the speed V of the airplane 2 must not exceed so as not to damage the slats 12 during their deployment. Beyond this speed Vthres3, the deployment of the slats 12 is disabled so as to protect them against excessive aerodynamic loads.

Figure 6:
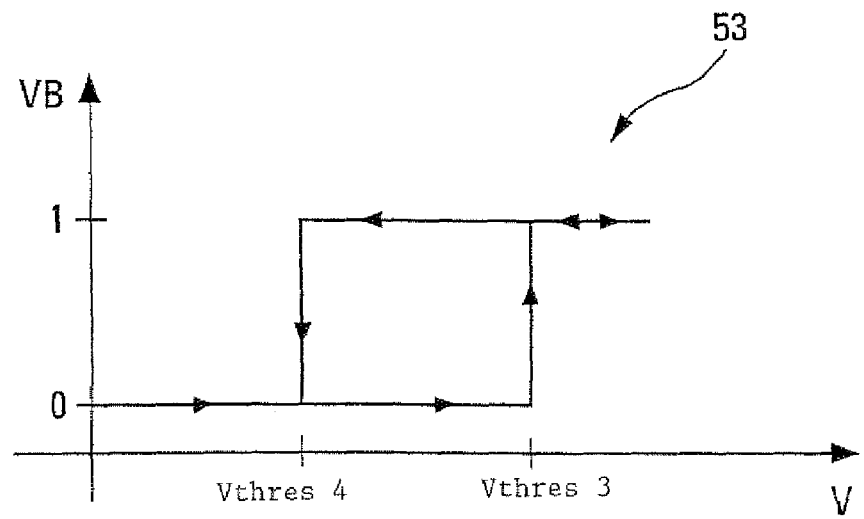

Moreover, in order to avoid perpetual movement of said slats 12 in the case where the speed V of the airplane 2 oscillates around this speed Vthres3, a hysteresis element 53 (FIG. 6) is introduced into the comparator 50. Thus, as long as the speed V of the airplane 2 has not dropped back below a speed Vthres4 (less than the speed Vthres3 and transmitted via a link 52B to the comparator 50), said comparator 50 sends the value "1" to the AND logic gate 47 as binary value VB, that is to say the slats 12 are then not permitted to be deployed. They therefore remain retracted. When the speed V of the airplane 2 becomes less than the speed Vthres4, the value "0" is transmitted, as binary value VB, to the OR logic gate 47.

Additionally, the means 46 verifies whether the deployment of said slats 12 is compatible with the flight altitude of the airplane 2. To this end, said means 46 comprises a table 55 giving, as a function of the configuration that one seeks to achieve (link e5), the maximum possible altitude for this configuration. For example, deployment of the slats 12 from their "0" position ("cruising" position) is permitted only if the flight altitude is below 20 000 feet (around 6 000 meters). Thus, if the difference calculated by a means 56 between the altitude (received via the link e4) of the airplane 2 and the maximum altitude given by the table 55 is positive (verification made by a comparator 57), it is prohibited to deploy the slats 12.

The prohibiting of deployment of the slats 12 is therefore related to two conditions: a condition related to the speed (and hence to the aerodynamic loads applied to said slats 12) and a condition related to the flight altitude. If one or other of these conditions is encountered, the slats 12 are not permitted to be deployed, by virtue of the OR logic gate 47.

Nevertheless, the activation of the Boolean prohibiting the deployment of the slats 12 is effected only if the pilot requests deployment of said slats 12. This condition is determined by a means 54 detecting the order on the part of the pilot of the airplane 2 for deployment of said slats 12. It is therefore necessary for the control member 16 to leave the position representative of the current configuration (element 58) and (AND logic gate 59) be positioned in the position representative of the future configuration (element 60).

Thus, in case of request of deployment of the slats 12 by the pilot and of excessive speed or overly high altitude, the order for prohibition of deployment of the slats 12 is activated. This is the function implemented by an AND logic gate 61 which is connected by links 62 and 63 respectively to said gates 47 and 59.

Stated otherwise, said means 61 disables the control orders corresponding to any actuation of the control member 16 to deploy said slats 12 when, at one and the same time, said means 54 detects such actuation and said means 47 produces disabling orders.

It will be noted that the control order sent to the actuation means 14 is therefore dependent on the flight conditions. If no counter-indication to modify the standard behavior is activated, the control means 18 reacts in standard manner to the orders given by the pilot by way of the control member 16, that is to say the position of the slats 12 is then calculated by a standard table which is integrated into the control means 18. This table is dependent on the position, determined by the pilot, of the control member 16.

If the device 20 prohibits the deployment of the slats 12, the latter retain their current position [the switching means 43 (FIG. 2) is then brought into a state PO and is no longer connected to the control means 18].

If the device 19 orders the retraction of the slats 12, the latter are retracted into a configuration affording them complete safety vis-à-vis the aerodynamic loads and the stalling angle of incidence. This configuration is determined by the device 19 as a function of the current position of the control member 16, of the angle of incidence α and of the Mach number of the airplane 2. When the flight conditions again become favorable to a deployment of the slats 12, said device 19 disables the signal ordering the retraction of the slats 12. The slats 12 are then again controlled in usual fashion by the control means 18.

Additionally, it will be noted that all the tables of the system 1 in accordance with the invention originate from structural or aerodynamic calculations carried out by computer models and validated by in-flight trials.

The present invention described above is applied, in accordance with a preferred embodiment, to leading edge slats 12 of wings 4 of an airplane 2. Of course, such a description is not limiting, the present invention being applicable to other aircraft lift-enhancing devices, for example simultaneously to said slats 12 and flaps 13 of the airplane 2.

The invention claimed is:

1. A system for automatically controlling lift-enhancing devices of an aircraft, in particular wing leading edge slats, which are able to be deployed and retracted, said system comprising:
   actuation means, for moving said lift-enhancing devices, as a function of control orders received;
   at least one control member able to be actuated by a pilot of the aircraft; and
   a control unit which comprises a control means which is able to produce control orders, as a function of the actuation of said control member, so as to control said means of actuation so that the latter bring said lift-enhancing devices into a determined position,
   wherein said control unit furthermore comprises:
   a first device able to produce, automatically, auxiliary control orders which are transmitted to said actuation means so as to automatically retract said lift-enhancing devices, when the aircraft is in a first flight condition; and
   a second device for automatically disabling control orders produced by said control means following actuation of said control member so as to deploy said lift-enhancing devices, when the aircraft is in a second flight condition.

2. The system as claimed in claim 1, wherein said first device continuously and automatically verifies whether the aircraft is in said first flight condition, by taking account of the speed and of the angle of incidence of the aircraft.

3. The system as claimed in claim 1, wherein said first device comprises:
   a first means for monitoring the speed of the aircraft and for emitting as appropriate a first signal indicating an overshoot of a permitted limit speed;
   a second means for monitoring the angle of incidence of the aircraft and for emitting as appropriate a second signal indicating an overshoot of a permitted limit angle of incidence; and
   a third means for producing said auxiliary control orders, when at least said first and second means emit said first and second signals at the same time.

4. The system as claimed in claim 3, wherein said first means compares the actual speed of the aircraft with said permitted limit speed corresponding to a permitted maximum speed, which depends on the current configuration and on the weight of the aircraft.

5. The system as claimed in claim 3, wherein said second means compares the actual angle of incidence of the aircraft with said permitted limit angle of incidence corresponding to a stalling angle of incidence which depends on a configuration of the aircraft that one seeks to obtain and on the Mach number of the aircraft.

6. The system as claimed in claim 3, wherein said first device furthermore comprises a fourth means for monitoring the derivative of the angle of incidence of the aircraft and for emitting as appropriate a fourth signal, and wherein said third means produces said auxiliary control orders, only when said fourth signal is emitted at the same time as said first and second signals.

7. The system as claimed in claim 6, wherein said fourth means comprises:
- a first element for comparing the derivative of the angle of incidence of the aircraft with a predetermined threshold value and for emitting as appropriate a signal indicating an overshoot of this threshold value;
- a second element for comparing the actual angle of incidence of the aircraft with an angle of incidence value dependent on the stalling angle of incidence and for emitting as appropriate a signal indicating an overshoot of this angle of incidence value; and
- a third element for producing said fourth signal, when said first and second elements emit overshoot signals at the same time.

8. The system as claimed in claim 1, wherein said second device verifies, automatically, whether the aircraft is in said second flight condition, by taking account of the speed and of the altitude of the aircraft.

9. The system as claimed in claim 1, wherein said second device comprises:
- a fifth means for monitoring the speed of the aircraft and for emitting as appropriate a fifth signal indicating an overshoot of a permitted limit speed;
- a sixth means for monitoring the altitude of the aircraft and for emitting as appropriate a sixth signal indicating an overshoot of a permitted limit altitude; and
- a seventh means for producing disabling orders, when at least one of said fifth and sixth means emits one of said fifth and sixth signals.

10. The system as claimed in claim 9, wherein said fifth means compares the actual speed of the aircraft with said permitted limit speed corresponding to a permitted maximum speed, which depends on the current configuration and on the weight of the aircraft.

11. The system as claimed in claim 10, wherein said fifth means furthermore comprises a hysteresis loop.

12. The system as claimed in claim 9 to 11, wherein said sixth means compares the actual altitude of the aircraft with said permitted limit altitude corresponding to a possible maximum altitude for a configuration of the aircraft that one seeks to obtain.

13. The system as claimed in claim 9, wherein said second device furthermore comprises:
- an eighth means able to detect any actuation of the control member to deploy-said lift-enhancing devices; and
- a ninth means which disables the control orders corresponding to such an actuation to deploy said lift-enhancing devices, when, at one and the same time, said eighth means detects such an actuation and said seventh means produces disabling orders.

* * * * *